Jan. 10, 1967  ÅGE WALÖEN ETAL  3,297,115
ADJUSTMENT DEVICE FOR SPRING PRESSURE BRAKES
Filed Oct. 2, 1964
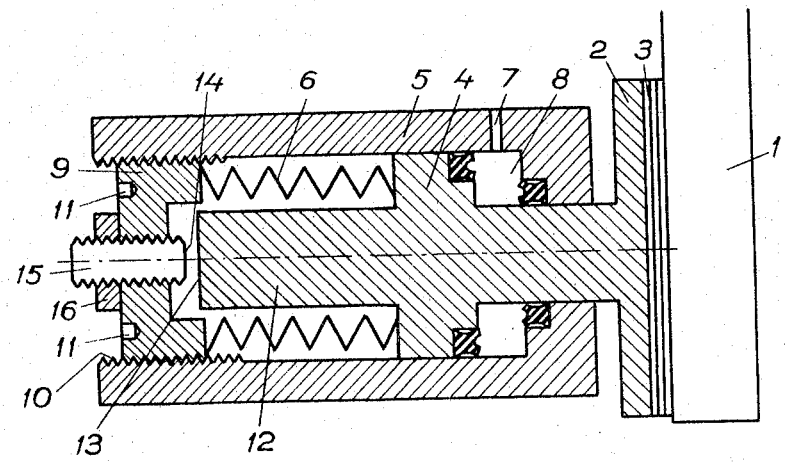
INVENTORS
ÅGE WALÖEN
ESKIL TUNEBLOM
BY Bailey, Stephens &
Huettig

United States Patent Office 3,297,115
Patented Jan. 10, 1967

3,297,115
ADJUSTMENT DEVICE FOR SPRING
PRESSURE BRAKES
Åge Waløen and Eskil Tuneblom, Vasteras, Sweden, assignors to Allmanna Svenska Elektriska Aktiebolaget, Vasteras, Sweden, a corporation of Sweden
Filed Oct. 2, 1964, Ser. No. 401,024
Claims priority, application Germany, Oct. 8, 1963,
A 44,246
3 Claims. (Cl. 188—170)

The present invention refers to an adjustment device for a brake, preferably a disc brake, comprising a brake power developing spring and a brake cylinder surrounding a movable piston, which, under the influence of a pressure medium supplied to the brake cylinder, is arranged to displace the brake block in the direction against the power of the brake spring.

In friction brakes the wear of the brake lining is compensated by adjustment of the brake block, so that the clearance between the brake block and the brake disc is kept constant. With normal pressure medium brakes it is relatively simple to bring about adjustment of the brake block by supplying the brake cylinder during the braking with a certain amount of additional pressure medium, so that the brake piston and the brake block are adjusted somewhat in the direction towards the brake disc. With spring pressure brakes, however, it is not satisfactory to adjust merely the position of the brake block, as in this way the distance between the contact surfaces of the brake spring becomes changed so that the braking power developed by the spring becomes weaker.

The object of the present invention is to obtain an adjustment device for spring pressure brakes, by which with especially simple means the brake clearance as well as the brake spring power may be adjusted at the same time in such a way that the brake spring power is always in a certain relation to the size of the brake clearance, irrespective of the wear of the brake lining. The invention is characterised in that the brake spring is supported against an adjustable member which is arranged adjustably in the direction of movement of the brake piston and that said member provides a stop for the brake piston when the brake block is completely released. A particularly simple construction is obtained if the adjustable member is made as an end wall in the brake cylinder, the adjustability being preferably brought about by having the member turning in a thread in the brake cylinder.

An embodiment of the invention is described below with reference to the enclosed drawing which shows a cross section through an adjustment device according to the invention.

In the figure, 1 shows a brake disc and 2 a brake block provided with a brake lining 3 which during braking travels towards the brake disc 1. The brake block 2 is connected to a brake piston 4 moving in a stationary brake cylinder 5. The braking power is developed by a brake spring 6 which is supported directly by the brake piston 4. When the brake is to be released, pressure medium is supplied through an opening 7 to the pressure chamber 8 of the brake cylinder, whereby the pressure medium acts on the brake piston 4 so that it moves to the left in the figure. The brake spring 6 is a pressure spring which is compressed between abutments formed by the brake piston 4 and one end wall 9 of the brake cylinder. The end wall 9 has the form of a turnable closure which turns in a thread 10 in the cylinder wall. For turning the closure 9 suitable bores 11 are arranged to receive a suitable wrench tool. The brake piston 4 is made with an axially extended center part 12, whose end surface engages a stop face 14 on a central part 15 of the closure 9 when the brake block is completely released. The distance between the surfaces 13 and 14 when the brake is applied corresponds consequently to the brake clearance when the brake is completely released. When the brake lining 3 is worn so that the brake clearance becomes too large, it is only necessary to adjust the closure 9 to the right in the figure in order to bring the brake clearance back to its original value. The adjusting of the clearance means that also the brake spring power is corrected to its original value as the left supporting surface of the brake spring is adjusted the same distance to the right as the brake piston 4. In this way the braking power as well as the brake clearance are adjusted at the same time by a simple turning of the closure 9.

When the central part 15 of the closure 9 as is shown in the figure consists of a separately adjustable member, there is the advantage that the braking power in one and the same brake arrangement can arbitrarily be adjusted to a desired value. The desired braking power is first set by turning the closure 9 when the brake is applied and then the desired clearance is set by turning the central part 15 of the closure 9. The part 15 can be fixed in relation to the closure 9 with the aid of a lock nut 16 and this fixing means that each successive adjustment of the brake clearance can be made by revolving only the closure 9, by which also the brake spring power automatically returns to the originally set value.

The invention is not limited to the embodiment shown but several variations and modifications are feasible within the scope of the following claims.

We claim:

1. A brake comprising a movable brake block, a stationary brake cylinder member, a piston member slidable in said cylinder member connected to said movable block, said cylinder and piston members having cooperating spring abutment means thereon, a brake power developing spring between said spring abutments urging said brake block in brake applying direction, said cylinder member forming a pressure chamber, one side of said piston member facing said pressure chamber, pressure medium supply means connected to said pressure chamber for moving said piston member against the force of said spring, one of said spring abutment means being adjustable with respect to its member in the direction of said movement of said piston, said adjustable abutment means having stop means engageable by the other member to limit the movement of said piston member in brake releasing direction, said spring being located in said cylinder member on the side of said piston member opposite the one facing said pressure chamber, said adjustable abutment means constituting an end wall of said brake cylinder member remote from said pressure chamber mounted for adjustment with respect to the brake cylinder member.

2. A brake according to claim 1, in which said end wall is threaded in said brake cylinder member.

3. A brake according to claim 1, in which said stop means of said adjustable abutment means is adjustable with respect to the adjustable abutment means.

References Cited by the Examiner
UNITED STATES PATENTS
2,754,805   7/1956   Beman.

FOREIGN PATENTS
889,023   2/1962   Great Britain.

DUANE A. REGER, *Primary Examiner.*